United States Patent [19]

Raftopoulos et al.

[11] 4,119,380

[45] Oct. 10, 1978

[54] METHOD FOR DETERMINING STRESS-OPTICAL CONSTANTS OF OPTICALLY ISOTROPIC AND ANISOTROPIC MATERIALS

[75] Inventors: Demetrios D. Raftopoulos; Stamatios V. Kartalopoulos, both of Toledo, Ohio

[73] Assignee: The University of Toledo, Toledo, Ohio

[21] Appl. No.: 761,128

[22] Filed: Jan. 21, 1977

[51] Int. Cl.$^2$ ............................................. G01B 11/16
[52] U.S. Cl. ........................................ 73/800; 356/32
[58] Field of Search ....................... 356/32, 33, 34, 35; 73/88 A

[56] References Cited

PUBLICATIONS

Reflected Shadow Method for the Study of Constrained Zones in Cracked Plates; Theocaris; Applied Optics; vol. 10, No. 10; Oct. 1971, pp. 2240–2247.

Primary Examiner—Vincent P. McGraw
Attorney, Agent, or Firm—Oliver E. Todd, Jr.

[57] ABSTRACT

A method for optically determining the stress-optical constants of optically isotropic and anisotropic materials. A collimated beam of monochromatic light is directed at the tip of a crack in a thin plate specimen under plane-stress from a direction substantially perpendicular to the surface of the specimen and to the direction of the stress. Reflected and transmitted stress-optical constants are determined from a ratio of the diameters of transmitted and reflected caustics from the specimen and the known Poisson's ratio and modulus of elasticity for the specimen.

3 Claims, 4 Drawing Figures

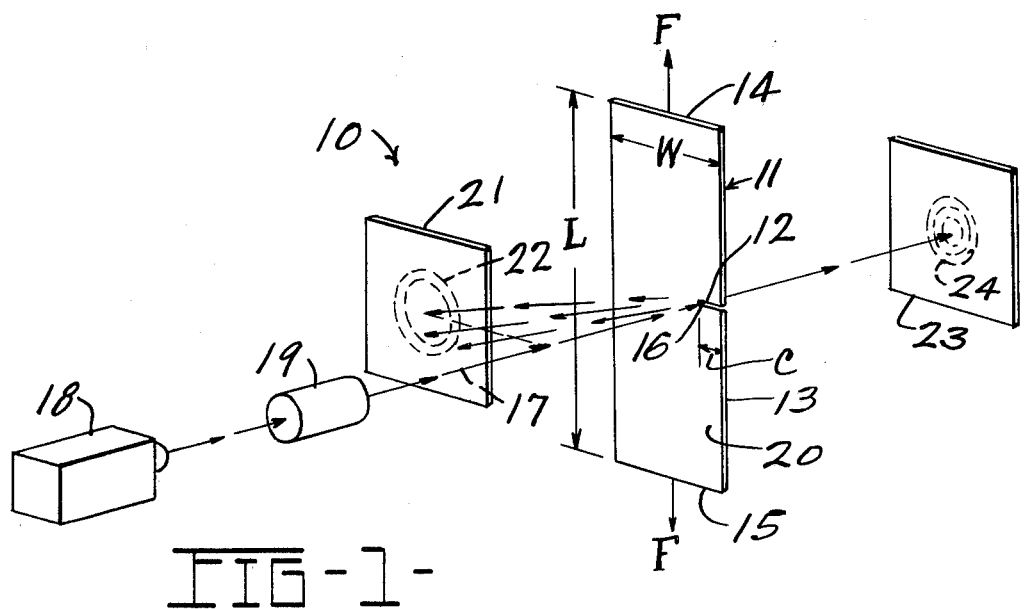
FIG-1-
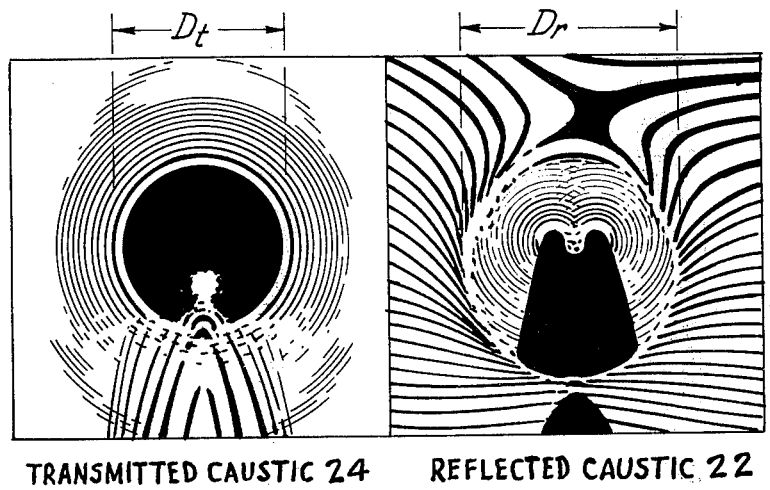
TRANSMITTED CAUSTIC 24      REFLECTED CAUSTIC 22
FIG-2-

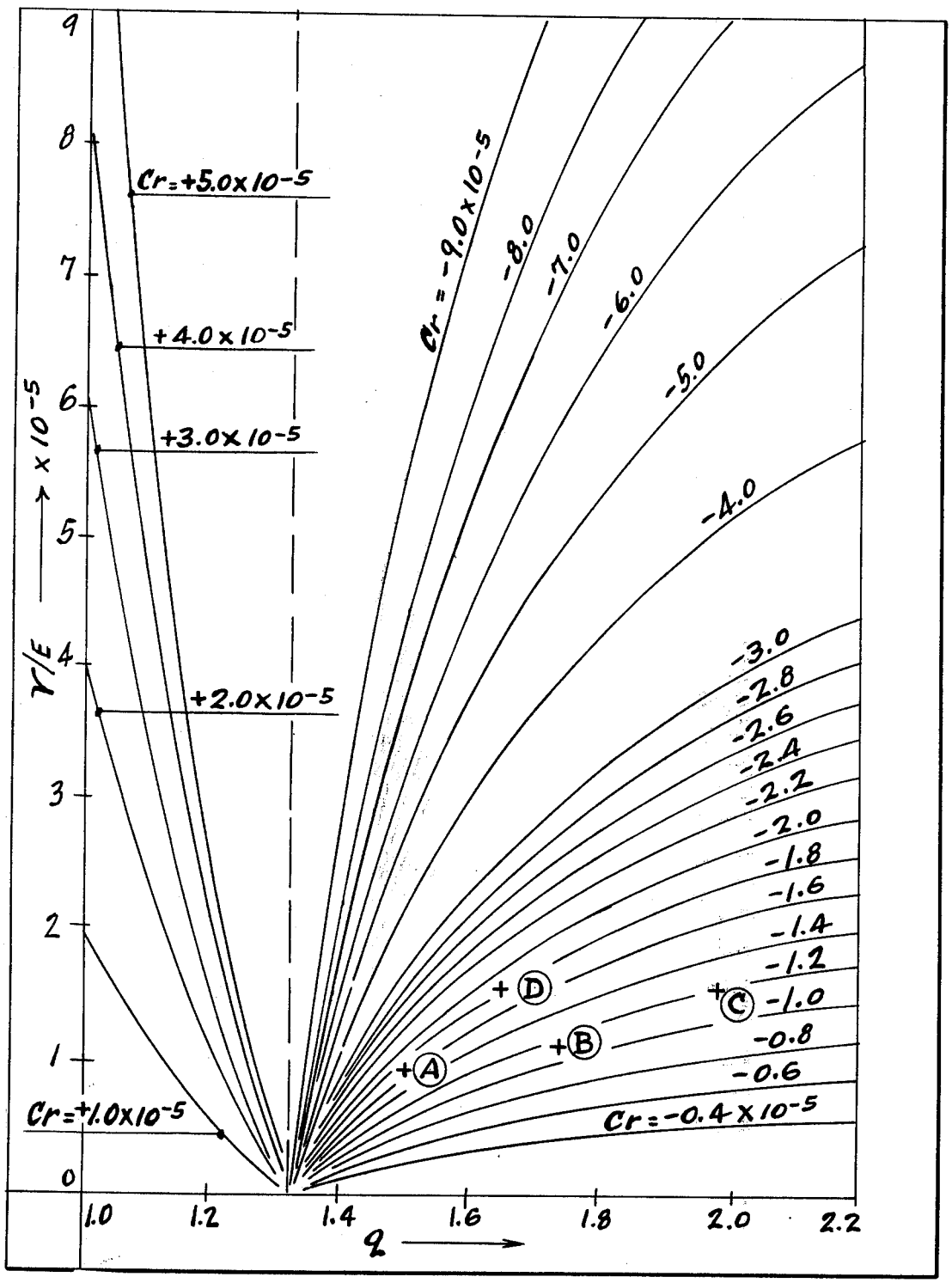
FIG-3-

METHOD FOR DETERMINING STRESS-OPTICAL CONSTANTS OF OPTICALLY ISOTROPIC AND ANISOTROPIC MATERIALS

BACKGROUND OF THE INVENTION

This invention relates to measuring and testing, and more particularly to an improved method for optically determining the stress-optical constants of optically isotropic and anisotropic materials.

Knowledge of the stress-optical constant or coefficient is useful when designing products manufactured from optically isotropic and anisotropic materials to prevent product failures when the material in the product is stressed. For a cracked specimen, the stress distribution at the tip of the crack is responsible for the propagation of the crack under certain conditions, and ultimately may result in a fracture of the product.

Prior art methods for measuring stress-optical constants of optically isotropic and anisotropic materials involve the use of a type of interferometer for producing an interferogram in a stressed specimen. For accuracy, it is necessary for the interferometer and the load on the specimen to be accurately calibrated. This requires very delicate and very expensive instruments. The instruments must be operated by specialized scientific personnel, further increasing the cost of these measurements. As a consequence, stress-optical constants generally are not measured or provided to the designer by the manufacturer of the material among the other standard mechanical specifications for the material.

SUMMARY OF THE INVENTION

According to the present invention, a method is provided for rapidly and accurately determining the stress-optical constants of optically isotropic and anisotropic materials with a minimum amount of apparatus and minimum skill on the part of an apparatus operator. The stress-optical constants for a specimen of a given material are determined from a comparison of reflected and transmitted caustics from a constrained zone near the tip of a crack in the specimen while the specimen is subjected to plane-stress.

According to the method of the present invention, a slit or crack is formed near the center of a long side of a rectangular flat specimen of the material to be measured. The interferogram consists of a dense fringe pattern representing the constrained zone which is separated from a sparse fringe pattern by a bright envelope called a caustic. The form of the caustic is approximately that of a circle. The specimen preferably has a length-to-width ratio of about three to four and the length of the crack is preferably about 0.1 to 0.3 times the width of the specimen. These dimensions assure that the formed caustics are free from influence of free surfaces of the specimen and that only uniform stresses are responsible for the constrained zone in the specimen. The specimen is loaded by applying a tensile force in a direction perpendicular to the crack. The amount of the loading on the specimen is not critical so long as the force is insufficient to cause a failure of the specimen. However, it should be noted that as the loading of the specimen increases, the diameters of the reflected and transmitted caustics also increase which in turn aids in the ease and accuracy of measuring the diameters of the caustics. A collimated monochromatic light beam such as a collimated beam from a laser is directed towards the end of the crack in the specimen from a direction substantially perpendicular to the specimen surface and to the load on the specimen. Caustics are reflected and transmitted from the point at which the light beam impinges upon the specimen in the vicinity of the crack end. The caustics appear as shadows on screens positioned equidistant on either side of the specimen. The diameters of the reflected and transmitted caustics are then measured. If desired, the caustics may be reflected to appear side by side on a single screen and photographed to facilitate measuring their diameters. A ratio ($q$) is determined by comparing the diameters of the reflected and transmitted caustics. It has been found that the reflected stress-optical coefficient of constant for the material ($c_r$) can be calculated from the following formula $$c_r = \frac{v}{E}\left(\frac{1}{2} - \frac{q^{5/2} - 1}{q^{5/2} - 2}\right)$$

where $v$ is Poisson's ratio and $E$ the modulus of elasticity for the material which either are provided by the material manufacturer or are easily measured. Or, the above formula may be plotted on a graph. By comparing the known ($v/E$) for the material with the measured ratio $q$ on the graph, the reflected stress-optical constant $c_r$ is readily determined. The transmitted stress-optical constant ($c_t$) is also readily determined from the reflected stress-optical constant $c_r$ and the ratio $q$ by the formula:

$$\frac{c_r}{c_t} = 0.5 q^{5/2}$$

Accordingly, it is an object of the present invention to provide a method for easily determining the transmitted and reflected stress-optical constants for optically isotropic and anisotropic materials.

Other objects and advantages of the invention will become apparent from the following detailed description, with reference being made to the accompanying drawings.

BRIEF DESCRIPTION OF THE DRAWINGS

FIG. 1 is a pictorial drawing of apparatus for obtaining the relative diameters of reflected and transmitted caustics in applying the method of the present invention;

FIG. 2 is a sketch showing typical reflected and transmitted caustics;

FIG. 3 is a graph for obtaining the reflected stress-optical constant from the known quantity ($v/E$) and the measured caustic diameter ratio $q$.

DESCRIPTION OF THE PREFERRED EMBODIMENT

Figure 4:
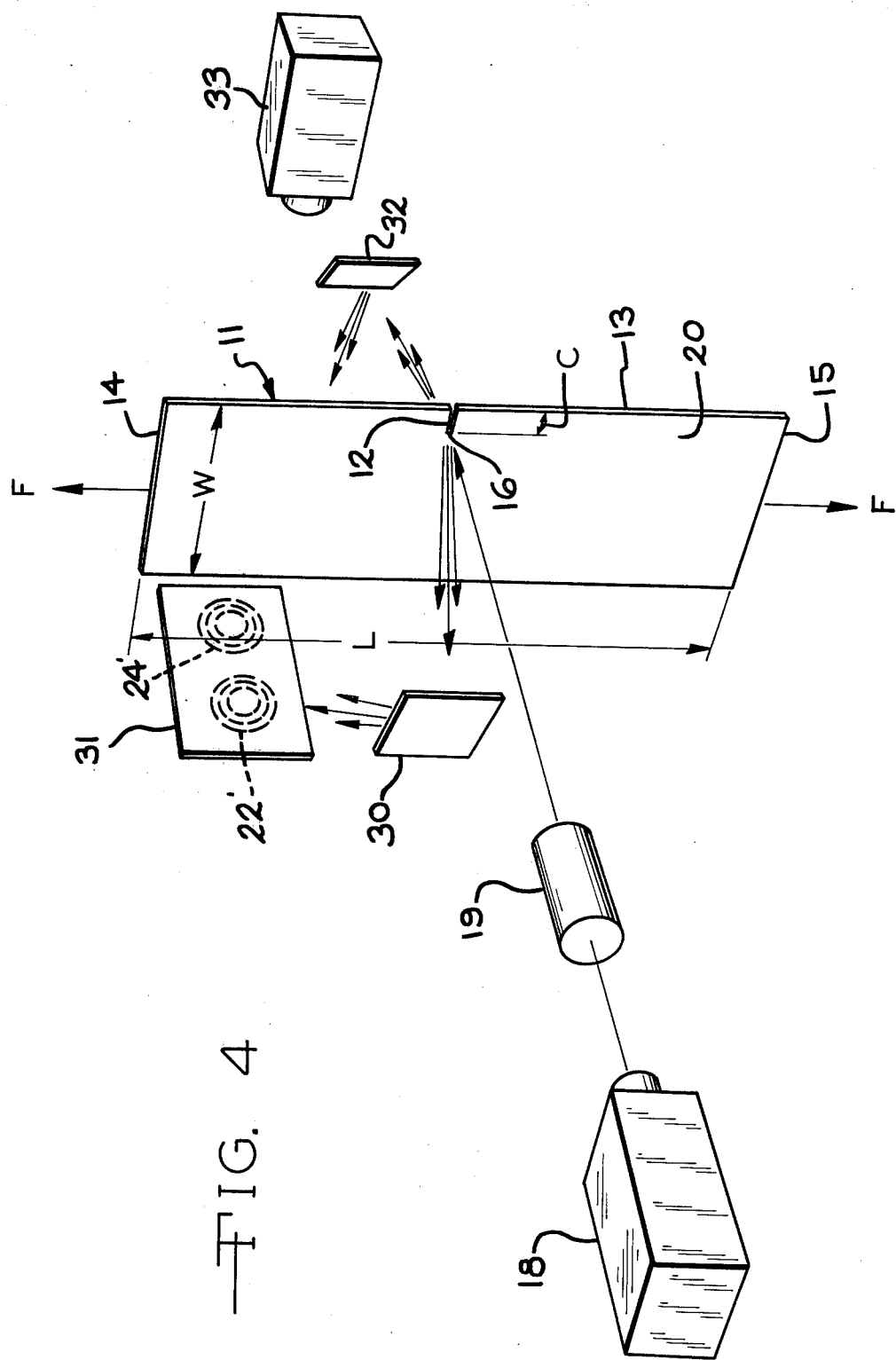
FIG. 4 is a pictorial drawing of a modification to the apparatus of FIG. 1.

Through the method of the present invention, the reflected and transmitted stress-optical constants are readily determined for optically transparent materials and specifically for optically isotropic and anisotropic materials. The method generally consists of forming a crack or slit extending perpendicular from near the center of a long edge of a flat rectangular specimen of a material for which the stress optical constant is required, stressing the material in a direction perpendicular to the crack, impinging a collimated monochromatic light beam on the specimen in the region adjacent the tip of the crack to produce reflected and transmitted caustics, measuring the effective diameters of the reflected and transmitted caustics at points equidistant on either side of the specimen and finally determining the stress-optical constant from a ratio of the reflected-to-transmitted caustic diameters, Poisson's ratio and the modulus of elasticity for the material.

Turning to FIG. 1, a pictorial diagram is shown of apparatus 10 for obtaining reflected and transmitted caustics from a specimen 11 of either an optically isotropic material or an optically anisotropic material. The specimen 11 is in the form of a flat rectangular sheet having a length L and a width W. A narrow crack or slit 12 is formed in a region near the center of one of the longer edges 13 of the specimen 11. The crack 12 extends substantially perpendicular from the edge 13 for a distance or length C. A load or force F is applied to opposite ends 14 and 15 of the specimen 11 to induce planar stresses in the specimen 11 in a direction substantially perpendicular to the crack 12. The critical area in the specimen 11 is a tip region 16 of the crack 12 since the crack 12 will propagate from the tip 16 when the force F is increased sufficiently. Therefore, the caustics are produced from the region of the constrained zone in the vicinity of the crack tip 16. In preparing the specimen 11, steps should be taken to assure that the caustics are not adversely influenced by free surfaces of the specimen 11. Preferably, the length L of the specimen 11 should be about three to four times the width W of the specimen 11. If the length of the crack 12 is less than this value, the caustics may be influenced by the edge 13 of the specimen 11. The crack 12 may have a greater length C than 0.3 times the width W of the specimen 11, however, the specimen 11 will be appreciably weakened and stresses in the region of the crack tip 16 will increase as the crack length C increases.

The caustics are produced by impinging a collimated monochromatic light beam 17 on the specimen 11 in the constrained region adjacent the crack tip 16. The light beam 17 may be produced by any suitable source, such as a laser 18 and a collimator 19. The beam 17 is directed to the specimen 11 from a direction substantially perpendicular to a flat surface 20 of the specimen 11. The beam 17 should be projected from within about 1° of a perpendicular to the specimen surface 20. However, the beam 17 should not extend exactly perpendicular to the surface 20 since it should not coincide with or interfere with the caustic reflected from the specimen surface 20.

A screen 21 is spaced from the specimen surface 20 and adjacent the path of the collimated monochromatic light beam 17 for intercepting and displaying through the shadow method a reflected caustic 22. Similarly, a screen 23 is positioned on an opposite side of the specimen 11 for intercepting and showing by the shadow method a transmitted caustic 24. The screens or plates 21 and 23 are spaced equal distances on opposite sides of the specimen 11. The reflected and transmitted caustics 22 and 24 are in the form of bright, generally circular envelopes defined between dense and sparse fringe patterns appearing on the screens 21 and 23. The diameters of the caustics 22 and 24 are directly proportional to the load or force F applied to the specimen 11. In other words, the diameters of the caustics 22 and 24 increase as the force F is increased, until failure or a complete fracture occurs in the specimen 11. The force F is generally established at a value which provides sufficiently large diameters to the caustics 22 and 24 to facilitate their measurement. The actual magnitude of the force F need not be known or measured. If desired, one or both of the caustics 22 and 24 may be reflected to appear on a screen side by side with the other caustic 24 or 22.

Such an arrangement is illustrated in FIG. 4, wherein a mirror or prism 30 directs the reflected caustic 22' to a screen 31 and a mirror or prism 32 directs the transmitted caustic 24' to the screen 31. The caustics may be measured on the screen 31, or a photograph may be made of the two caustics 22' and 24' with a camera 33" to facilitate measuring their diameters. If desired, a standard grid pattern can be printed on the screen for measuring the diameters of the caustics. After measurement, the diameter of the reflected caustic 22 is divided by the diameter of the transmitted caustic 24 to obtain a diameter ratio $q$. The caustic diameter ratio $q$ is then used for obtaining the reflected and transmitted stress-optical constants or coefficients for the specimen 11.

An illustration showing exemplary reflected and transmitted caustics 22 and 24, respectively, for a specimen is shown in FIG. 2. The diameter of the reflected caustic 22 is indicated by $D_r$ and the diameter of the transmitted caustic is indicated by $D_t$. If the reflected caustic diameter $D_r$ is 1.38 inches and the transmitted caustic diameter $D_t$ is 1.05 inches, then the diameter ratio $q$ equals 1.31.

After the caustic diameter ratio $q$ is obtained, the reflected stress-optical constant $c_r$ for the specimen 11 is easily calculated or read from a chart. $c_r$ is influenced not only by the diameter ratio of the reflected and transmitted caustics, but also by Poisson's ratio $v$ and the modulus of elasticity E for the specimen 11. These values are generally provided by a material manufacturer. However, they are also easily measured by known techniques if they are not known. It has been found that the reflected stress-optical constant $c_r$ can be calculated from the following formula:

$$c_r = \frac{v}{E} \left( \frac{1}{2} - \frac{q^{5/2} - 1}{q^{5/2} - 2} \right)$$

Or, a graph may be established from this formula using a range of values $(v/E)$ for various specimen materials for one coordinate, a range of values $q$ for a second coordinates and charting a family of curves for various values of $c_r$. Such a graph is shown in FIG. 3. Through the use of the graph in FIG. 3, $c_r$ is quickly determined with a high degree of accuracy from the known value of $v/E$ and the measured caustic diameter ratio $q$ for a specimen. The actual reflected stress-optical constant $c_r$ for four specimens are shown in the table below and also are plotted on the chart of FIG. 3, where $v/E$ is in $cm^2/Kg \times 10^5$ and $c_r$ is in $cm^2/Kg$.

TABLE

| Specimen Material | | $\frac{v}{E}$ | q | $c_r$ |
|---|---|---|---|---|
| A. | Cast acrylic sheets | 0.9 | 1.5 | $-1.68 \times 10^{-5}$ |
| B. | Continuous processed acrylic sheets | 1.11 | 1.74 | $-1.11 \times 10^{-5}$ |
| C. | Clear polycarbonate sheets | 1.55 | 1.86 | $-\frac{1}{2} \times 10^{-5}$ |
| D. | Colored polycarbonate sheets | 1.55 | 1.64 | $-1.85 \times 10^{-5}$ |

It can be shown mathematically that the reflected and transmitted stress-optical constants for a specimen are related by the caustic diameter ratio $q$ in accordance with the following formula:

$$\frac{c_r}{c_t} = 0.5 q^{5/2}$$

Therefore, once the reflected stress optical constant $c_r$ is determined from $q$, either by calculation or by obtaining from a chart similar to that shown in FIG. 3, the transmitted stress-optical constant $c_t$ for the specimen is easily determined. It desired, a chart (not shown) may also be established for obtaining the transmitted stress-optical constant $c_t$ from the reflected stress optical constant $c_r$ and the caustic diameter ratio $q$.

From the above, it should be appreciated that the reflected and transmitted stress-optical constants for optically isotropic and optically anisotropic materials are readily determined from a specimen of such materials. The method of the present invention for obtaining the stress optical constants is particularly useful since only one simple measurement is required, namely, the ratio of the diameters of two formed caustics. Furthermore, the caustics are produced by relatively simple and inexpensive instruments which do not require accurate calibration. The method of the present invention is further simplified by the fact that to a great extent, the dimensions of the specimen are not critical. Nor is it necessary to accurately measure or calibrate the force applied to the specimen or to know the exact wavelength of the collimated monochromatic light beam impinged upon the specimen since these factors do not influence the diameter ratio between the reflected and transmitted caustics. It will be appreciated that various modifications and changes may be made in the above-described method without departing from the spirit and the scope of the following claims.

What we claim is:

1. A method for determining a stress-optical constant of optically isotropic materials and optically anisotropic materials comprising the steps of:

forming a crack in a flat rectangular material specimen having a predetermined Poisson's ratio and modulus of elasticity, said crack extending from a region at the center of a long edge of said specimen into said specimen a distance sufficient to assure that caustics formed from a constrained region adjacent a crack tip are free from the influence of free surfaces of the specimen;

applying a tensile load to said specimen in a direction perpendicular to said crack;

impinging a collimated monochromatic light beam on the constrained region in said specimen adjacent the crack tip from a direction substantially perpendicular to a flat surface of the specimen and to the load applied to the specimen whereby caustics are transmitted through and reflected from the specimen;

measuring the effective diameters of the transmitted and reflected caustics at locations spaced equal distance from and on either side of the specimen; and determining a stress-optical constant for the specimen from the measured diameters of the reflected and transmitted caustics and the predetermined Poisson's ratio and modulus of elasticity of the specimen.

2. A method for determining a stress-optical constant of optically isotropic materials and optically anisotropic materials, as set forth in claim 1, wherein the effective diameters of the transmitted and reflected caustics are measured by reflecting at least one of said caustics to appear on a screen adjacent the other of said caustics without affecting the relative ratio between the diameters of said caustics, and measuring the diameters of said caustics on said screen.

3. A method for determining a stress-optical constant of optically isotropic materials and optically anisotropic materials, as set forth in claim 2, and further including the step of photographing said screen, and wherein the diameters of said caustics on said screen are measured on said photograph.

* * * * *